United States Patent [19]

De Santis et al.

[11] 3,709,672
[45] Jan. 9, 1973

[54] METHOD AND APPARATUS FOR FLUORINE SURFACE TREATMENT OF GLASS ARTICLES

[75] Inventors: Urbano J. De Santis; Herbert C. Snyder, both of Brockway, Pa.

[73] Assignee: Brockway Glass Company, Inc, Brockway, Pa.

[22] Filed: Jan. 11, 1971

[21] Appl. No.: 105,369

[52] U.S. Cl..................65/30, 117/97, 117/106 R, 117/123 A, 118/48
[51] Int. Cl..............................................C03c 17/00
[58] Field of Search...65/30; 117/97, 106 PU, 123 A; 118/48

[56] References Cited

UNITED STATES PATENTS 2,995,463   8/1961   Meister et al.....................117/97 X
3,314,772   4/1967   Poole et al..............................65/30

*Primary Examiner*—Edward G. Whitby
*Attorney*—Christel & Bean

[57] ABSTRACT

It is known to render the interiors of glass containers corrosion resistant by contacting such interiors with a fluorine containing gas while the glass article is hot enough to pyrolyze the fluorine containing gas and thus deposit fluorine on the glass surface. Small thin-walled glass vials do not retain enough heat to pyrolyze the fluorine gas due to rapid cooling of the vial by the gas and the relatively low deformation temperatures of such vials. The present invention provides a method and apparatus whereby the vials are heated to temperatures safely below their deformation temperature and then exposed interiorly to gas-air mixtures heated to a temperature approaching the pyrolyzing temperature of the fluorine gas compound of the gas-air mixture. Thus the combined heat of the vial and the gas is available for instantaneously pyrolyzing the gas to deposit fluorine on the glass surface without deformation of the vials.

6 Claims, 6 Drawing Figures

INVENTOR.
URBANO J. DE SANTIS
HERBERT C. SNYDER
BY
Christel & Bean
ATTORNEYS

METHOD AND APPARATUS FOR FLUORINE SURFACE TREATMENT OF GLASS ARTICLES

BACKGROUND OF THE INVENTION

This invention relates to the surface treatment of newly formed glass articles to increase the chemical durability of such surfaces and render them more resistant to corrosion. More particularly, the invention relates to the application of a fluorine-containing material to the surfaces of relatively thin-walled glass articles such as containers.

In U.S. Pat. No. 3,314,772, dated Apr. 18, 1969 to James P. Poole, et al. there is disclosed a method of treating glass surfaces to increase the chemical durability and corrosion retarding properties of the surfaces by applying fluorine compounds to the heated surfaces of glass containers, whereby the applied fluorine material pyrolyzes and thus makes fluorine ions available for exchange with oxygen ions and hydroxyl ions. The methods disclosed and described in the Poole et al patent are fully workable with conventional glass bottles since such bottles, when heated to desired levels, have enough mass and thus sufficient heat to fully pyrolyze the applied fluorine-containing material.

The foregoing method, however, is not practicable in the case of relatively thin-walled glass articles such as glass vials which are commonly used for pharmaceutical and other purposes. Such glass vials are conventionally made by cutting lengths of extruded glass tubing, fusing a separate glass disc to the bottom thereof, and treating the opposite end of the tubing to form a finish for the vial. It is not practical to treat such vials with fluorine in the manner described in the Poole et al patent because the vials cool too rapidly upon the application of the fluorine material to fully pyrolyze the applied material and render the fluorine available for ion exchange. Accordingly, special corrosion retarding treatment of such vials is effected by treating the interior surface of the extruded glass tubing with fluorine immediately subsequent to the extrusion of the glass tubing, with a separate fluorine treatment for the interior surface of the bottom element of the vial, and a still further third step to effect fluorine treatment of the finish of the vial. This treatment is relatively costly and not fully effective to insure fluorine treatment of all parts of the interior surfaces of the ultimate vials.

SUMMARY OF THE INVENTION

According to the present invention, glass vials are interiorly treated by fluorine application in a single step after the vial is completely formed, thus providing the same direct and complete fluorine treatment as in the case of bottles of conventional size and wall thickness. This renders the fluorine corrosion retarding treatment of the interiors of glass vials as economical and as thoroughly effective as the treatment of conventional glass containers of larger size.

Speaking generally, the treatment of the present invention overcomes the low heat retaining capacity of glass vials by heating the same to the maximum practical temperature without deformation and then applying to the interior surfaces of the vial a pyrolyzable fluorine-containing material which is heated to such degree that the combined heat of the glass article and the fluorine material achieves the desired pyrolysis of the fluorine-containing substance immediately upon contact with the hot glass.

DESCRIPTION OF THE PREFERRED EMBODIMENT

In the preferred embodiment, individual vials which have been fully formed and fashioned are disposed in inverted condition over a series of upstanding holders which are attached to a conveyor chain or belt and pass through an elongated heating chamber. The heating chamber is equipped with infra-red burners along its opposite interior side walls which radiate heat toward the vials and the vials are adapted to be rotated during their passage through the heating chamber so that they are uniformly heated.

Figure 1:
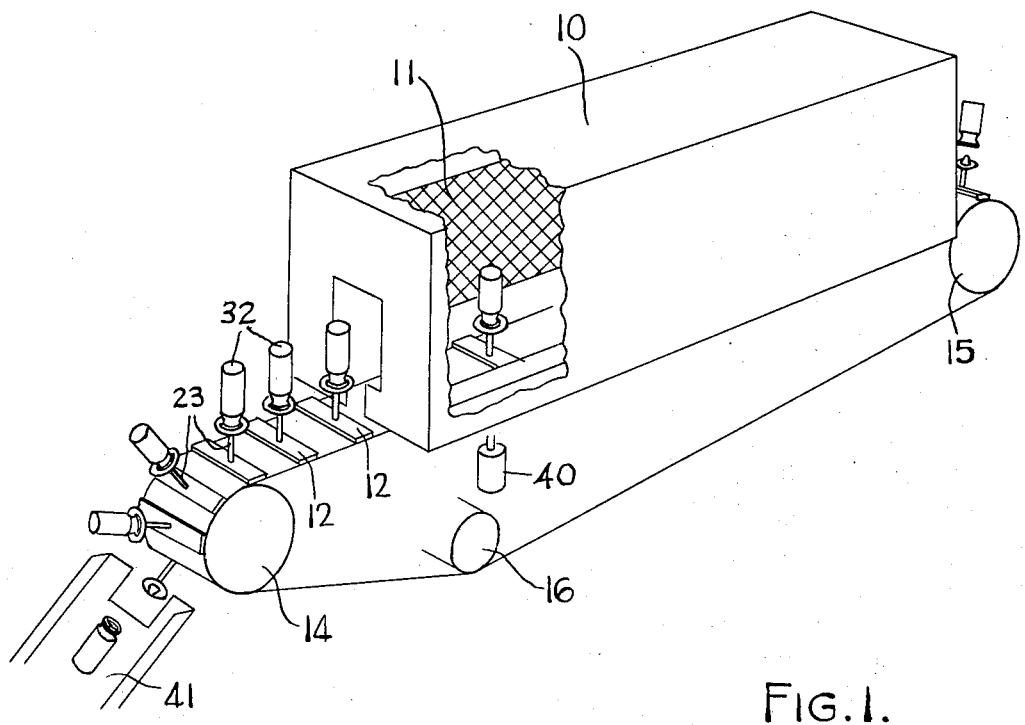
FIG. 1 is a somewhat schematic perspective view of one form of the vial treatment apparatus of the present invention.

Referring particularly to FIG. 1, the numeral 10 designates a heating chamber which has infra-red gas fired burners along its opposite side walls, the burners being of conventional design. A series of blocks 12 are attached to drive chains designated 13 in FIG. 2, which drive chains pass about sprockets shown schematically in FIG. 1 and designated 14 and 15. Idler tensioning sprockets 16 may likewise be provided. Within chamber 10 the series of spaced blocks 12 pass between and are guided by upper and lower guide members 20 and 21, as shown in FIG. 2.

Each support block 12 carries means for receiving and supporting an individual vial and for conducting heating gas thereinto. Referring to FIG. 2, a tube 23 is rotatably supported in block 12 by means of an antifriction bearing 24 and a sprocket 25 attached to its lower end engages a relatively stationary drive chain 26 which extends longitudinally in chamber 10 so that tube 23 is rotated by and upon its passage through chamber 10.

Adjacent to the upper end of each tube 23 is a collar 30 which is vertically adjustable on tube 23 and carries a conical projection 31 at its upper face. Individual vials 32 are placed over the upper end of tube 23 in inverted position and are generally located and centered by the conical projections 31. The conical projections are so proportioned as to allow space for gas within vial 32 to have access to the full interior surface of the neck portion of the vial.

Figure 2:
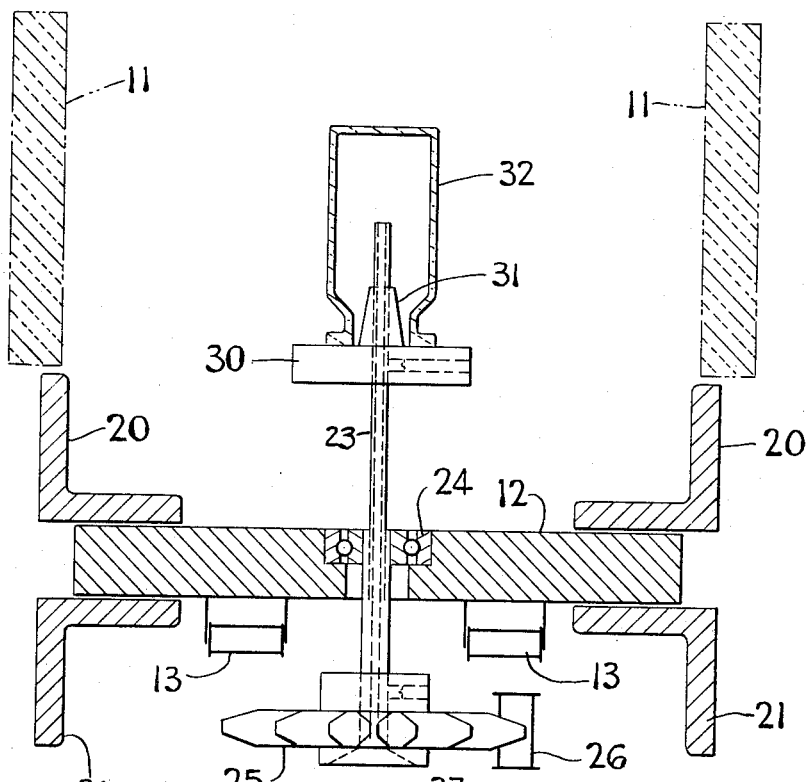
FIG. 2 is a transverse cross-sectional view through the apparatus of FIG. 1 at the treatment station.

The means for injecting treating gas into the interior of each vial 32 at a given treatment station is shown at the lower portion of FIG. 2 and comprises a fitting 35 having a treating gas passage 36 terminating in an ejection nozzle 37. In the illustrated form an elastomer seal collar 38 at the upper end of fitting 35 is adapted to fit within a tapered seat in the lower face of the hub portion of each sprocket 25 and a conventional air cylinder 40 periodically raises a fitting 35 to connect nozzle 37 with the interior of a tube 23 whereupon a predetermined quantity of heated treating gas is pulsed upwardly through tube 23 and into the interior of the particular vial 12 which is at the treating station. The support blocks 12 are indexed intermittently and successively to the treating station by an intermittent drive means (not shown) for the sprockets 14 and 15 which may be a conventional Geneva drive.

As shown in FIG. 1 individual vials are loaded onto the collars 30 of tubes 23 at the right-hand end of the heating apparatus and discharge from the collars 30 and tubes 23 by gravity at the left-hand end of the apparatus to be deposited in a delivery chute 41.

Figure 3:
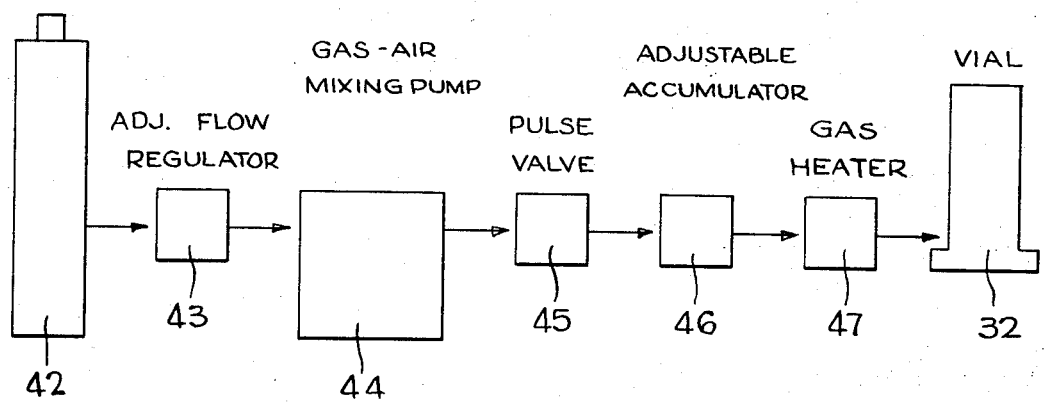
FIG. 3 is a block diagram showing the steps from the source of the treating gas to injection thereof into an individual vial.

The block diagram, FIG. 3, shows the flow of treating gas from a supply cylinder 42 through a flow regulator 43, a mixing pump for mixing the 1,1-difluoro-ethane gas ($CH_3CHF_2$) which is known commercially as Freon 152A with air in a preferred 5 percent mixture. The gas-air mixture then flows through a pulsing valve 45, an accumulator 46, and a gas heater 47 to fitting 35 and thence to the interior of a vial 32.

Figure 5:
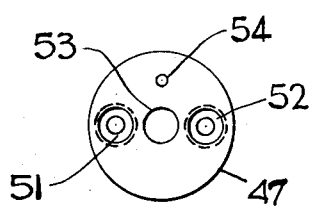
FIG. 5 is a top plan view of the heating means of FIG. 4.
Figure 4:
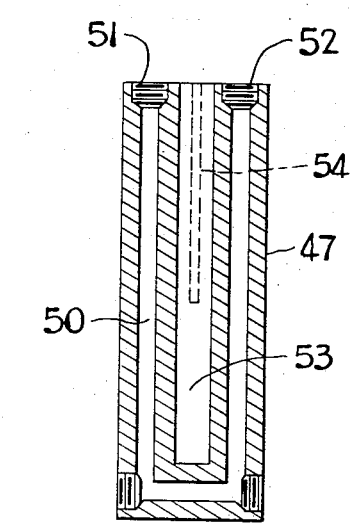
FIG. 4 is a cross-sectional view through one form of heating means for the treating gas.

An exemplary form of heater 47 is shown in FIGS. 4 and 5 wherein a cylinder of stainless steel or Inconel has a U-shaped gas passage 50 having inlet and outlet ports 51 and 52 and a well 53 for receiving a heating element and a bore 54 for receiving a thermocouple for measuring the heat level of the heater body 47.

While 1,1 difluoroethane gas is the preferred source of fluorine for the corrosion retardant treatment of the present invention, this specific gas is preferred for the reason that it has no toxic by-products or emanations. As far as the corrosion retardant results are concerned, virtually any fluorine compound which pyrolyzes at approximately the same temperature as difluoroethane may be employed. Specifically, virtually any of the fluorine compounds listed in the above-identified Poole U.S. Pat. No. 3,314,772, in Table II, may be employed.

Figure 6:
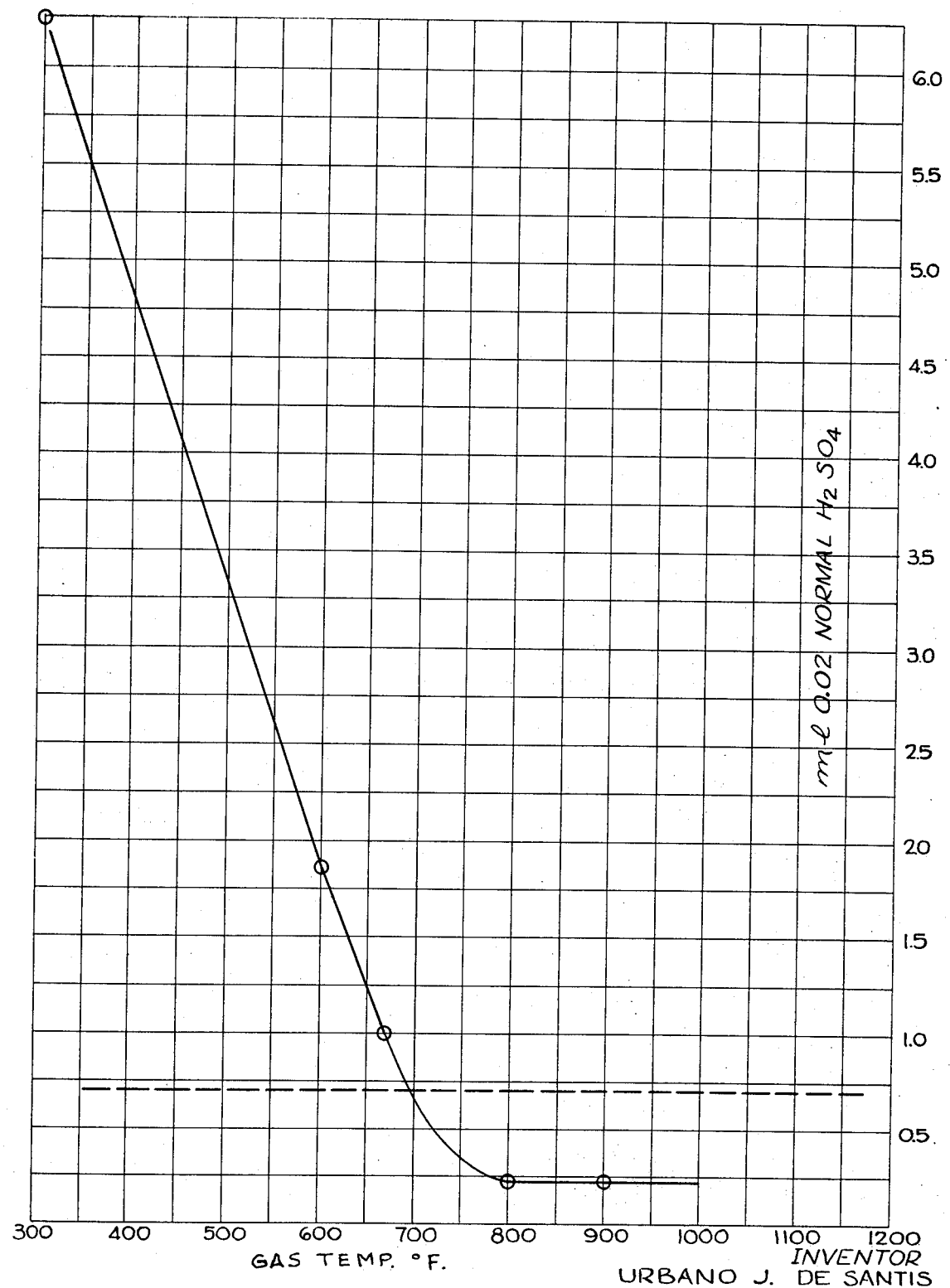
FIG. 6 is a graph showing comparative corrosion-retardant results obtained by employing heat treating gas in accordance with the present invention.

To measure the efficacy of the present treatment, vials treated in accordance with the foregoing procedure were analyzed for chemical durability utilizing the procedures prescribed by the USP for Type II glass. The graph, FIG. 6, shows the results of treatment of 5 c.c. soda lime glass vials preheated to 1,200° F, then pulsed with a 5 percent 1,1 difluoroethane in air mixture, the gas-air mixture being preheated to various temperatures as indicated along the bottom of the graph. The vertical measurements on the graph indicate, in accordance with prescribed USP tests, the amount of acid required to neutralize extracted alkali in the treated glass. The figures in the graph denote ml of 0.02 normal $H_2SO_4$.

It will be noted that the amount of acid thus required drops sharply upon increases in temperature of the gas-air mixture and levels off at about 800° F. The dotted line indicates the maximum amount of acid permitted by USP Type II glass specifications and this level is reached at approximately 700° F.

While the gas-air mixture may be heated to any temperature below its pyrolyzing temperature, it is found that heating the same much above 1,000° F. may result in premature pyrolysis and accordingly the most useful range of temperatures for the gas-air mixture may be said to be from 700° to 1,000° F.

To expedite the pyrolysis of the fluorine compound the temperature of the glass should be as high as is practical without reaching the deformation temperature. The low limit of the temperature to which the glass article is raised depends upon the mass of the glass article since the greater the mass the slower the cooling rate and the less the glass is cooled by contact with the gas-air mixture. Accordingly, the temperature range of heating of the glass article may be any temperature below the deformation point of the glass article. This deformation point will vary with variations in the size, shape and wall thickness of the glass article but will in any event be below the softening point of the glass.

A preferred embodiment of this invention having been described and illustrated in the drawings, it is to be realized that modifications thereof may be made without departing from the spirit and scope of this invention.

We claim

1. The method of treating glass articles of relatively light weight to render surface portions thereof corrosion resistant which comprises heating the articles to a temperature approaching but safely below the deformation temperature of the articles and directing against such surface portions a gaseous fluorine compound with said compound at a temperature between about 700° F. and the pyrolyzing temperature of the fluorine compound whereby fluorine is liberated upon contact of the compound with the glass surface and deposited on such surface portions, whereby said fluorine is available for ion exchange with oxygen ions and hydroxyl ions at said surface portion of the glass articles.

2. A method according to claim 1 wherein said articles are glass containers and wherein said gaseous fluorine compound is directed to the interiors of said containers.

3. A method according to claim 2 wherein said containers are rotated during heating thereof to promote uniform heating of said containers.

4. A method according to claim 1 wherein said gaseous fluorine compound is mixed with air in proportions of about 5 percent of said compound and 95 percent air, the mixture being applied to the glass article surface portions at a temperature between about 700° F. and the pyrolyzing temperature of said compound.

5. A method according to claim 1 wherein said fluorine compound comprises 1,1-difluoroethane ($CH_3CHF_2$).

6. A method according to claim 4 wherein said fluorine compound comprises 1,1-difluoroethane ($CH_3CHF_2$).

* * * * *